L. G. McKAM.
SAW SETTING TOOL.
APPLICATION FILED SEPT. 19, 1908.

936,800.

Patented Oct. 12, 1909.
2 SHEETS—SHEET 1.

Witnesses
Clarence E. Day
H. M. Swan

Inventor
Lawrence G. McKam
By Parker & Burton
Attorneys

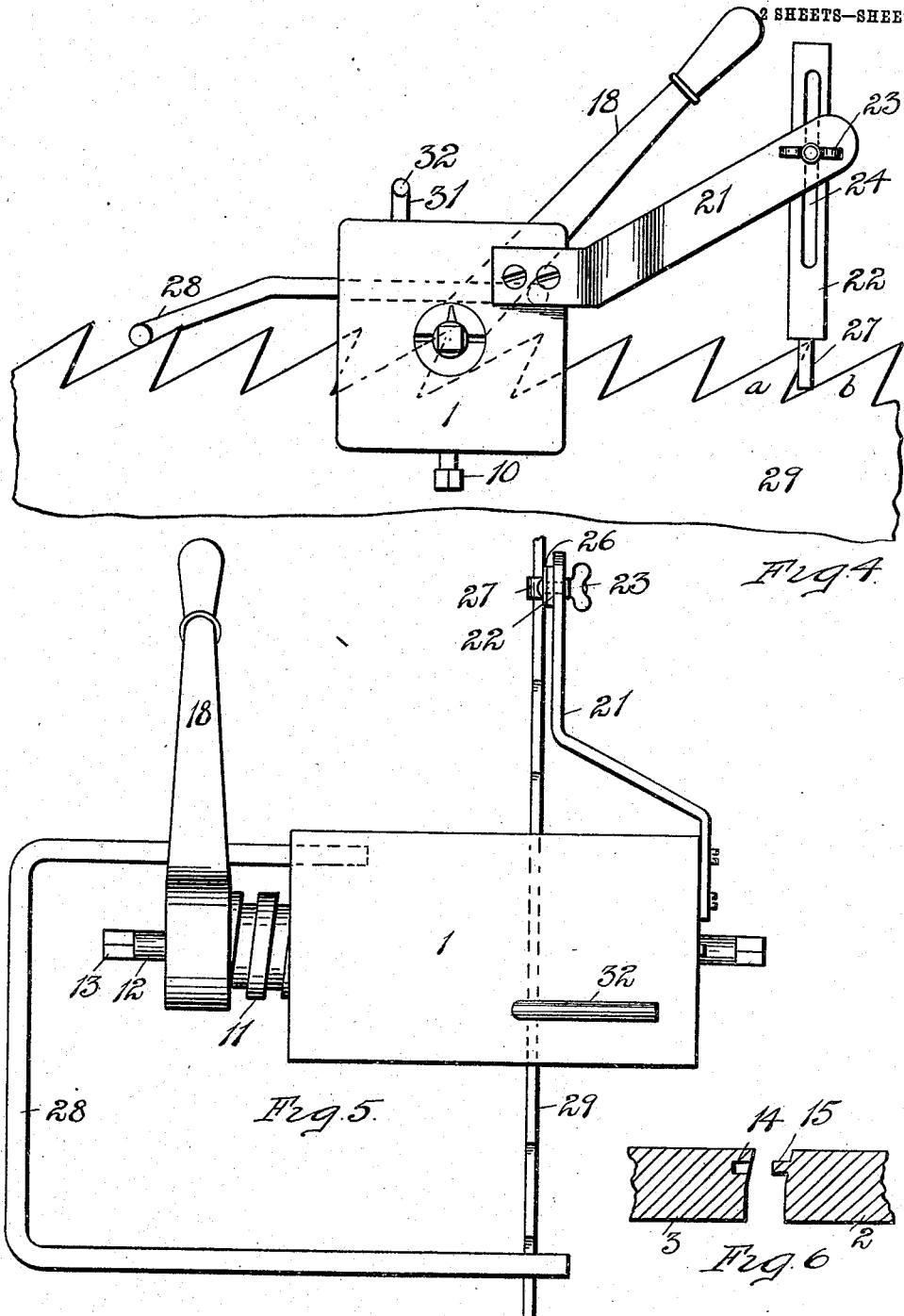

UNITED STATES PATENT OFFICE.

LAWRENCE G. McKAM, OF DETROIT, MICHIGAN.

SAW-SETTING TOOL.

936,800. Specification of Letters Patent. Patented Oct. 12, 1909.

Application filed September 19, 1908. Serial No. 453,796.

*To all whom it may concern:*

Be it known that I, LAWRENCE G. McKAM, a citizen of the United States, residing at Detroit, county of Wayne, State of Michigan, have invented a certain new and useful Improvement in Saw-Setting Tools, and declare the following to be a full, clear, and exact description of the same, such as will enable others skilled in the art to which it pertains to make and use the same, reference being had to the accompanying drawings, which form a part of this specification.

This invention relates to saw setting tools.

It has for its object an improved saw setting tool adapted to be set on the toothed edge of a saw, and to set the teeth in consecutive order, and the set is caused to travel along the edge of the saw and to be adjusted to set the teeth in both directions (the consecutive teeth in opposite directions) without changing the tool, but merely adjusting the tool.

Figure 1:
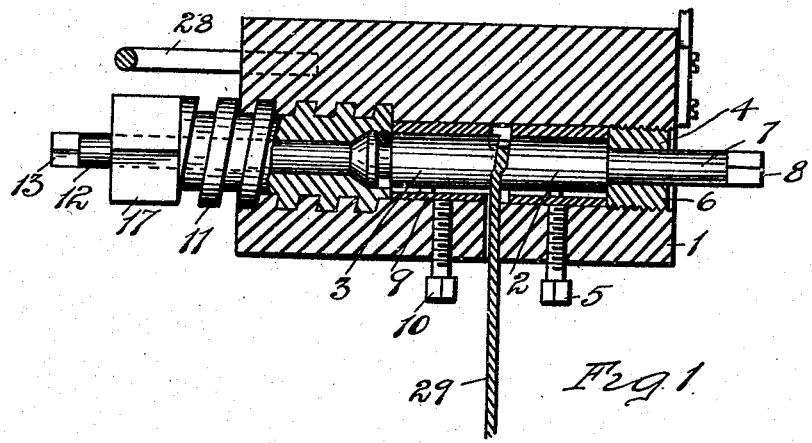
Figure 2:
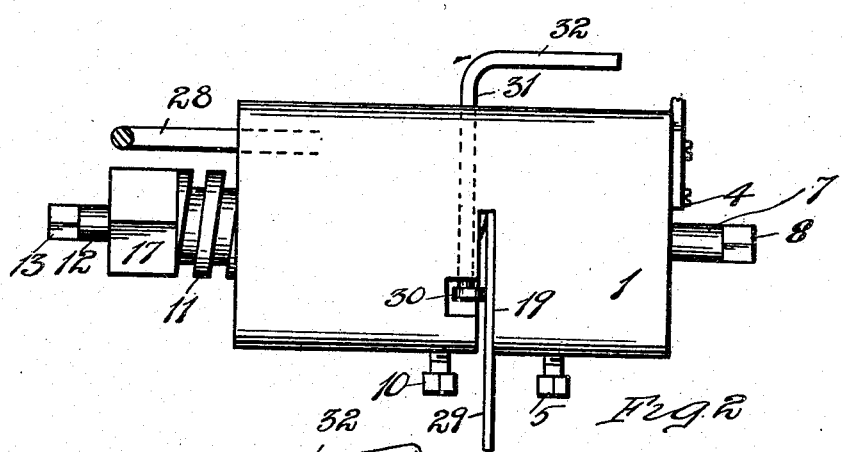
Figures 3, 7:
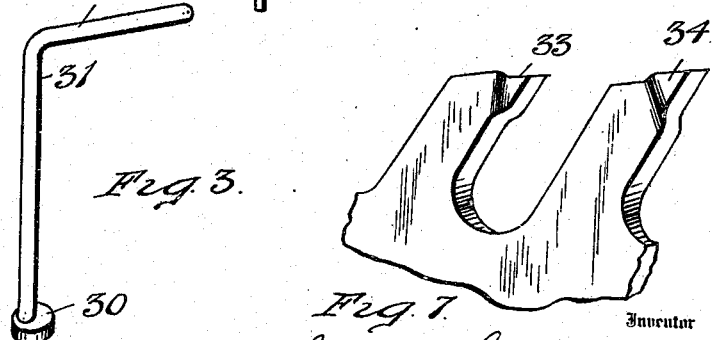

In the drawings:—Figure 1, is a vertical section. Fig. 2, is an elevation. Fig. 3, is a detail of cam shown in elevation in Fig. 1. Fig. 4, is an end elevation. Fig. 5, is a plan view. Fig. 6, is a detail, showing an interlocking feed of the anvil and the swage blocks. Fig. 7, shows the form of tooth produced.

The tool consists of a main block or body 1, in which is held an anvil 2, and a movable swage block or setting block 3. The anvil 2 engages through a bushing 4, through which it can reciprocate without turning. The bushing is held in place by a set screw 5, and is adjustably held in place in its longitudinal position in the bore of the block 1 by an adjusting screw 6 that is screwed into the end of the block, and forms an abutment for the anvil block 2. The adjusting screw 6 is perforated, and a stem 7 of the anvil block engages through the perforation and terminates on its outer end with a wrench hold 8 by means of which the stem and the anvil and the bushing may be turned on the longitudinal axis of the stem to adjust the anvil to its proper relation for the work to be done. Before this adjustment is made, the set screw 5 is loosened, and after the adjustment has been made, the set screw 5 is tightened to hold the anvil block and the bushing in its proper adjusted position. On the opposite end of the body block, but in continuation with the bore of the block in which the anvil engages, is a bore in which engages a bushing 9, and within the bushing 9, is a movable swage block 3 held from rotating by a feather, which engages in a long slot in the bushing, and the bushing itself is held in proper adjusted position by a set screw 10 that engages through the body block against the bushing 9. A coarsely threaded screw hole in axial alinement with the ways of the swage block 3 is provided with a driving screw 11 in swivel connection with the head of the swage block 3. A projecting stem 12 extending from the end of the swage block 3 extends through the central hole along the axis of the screw 11, and terminates beyond the end of the screw 11 with a wrench hold 13, by means of which the stem 12, the swage block 3, and the bushing 9, may be turned on the longitudinal axis of the stem 12 to bring the swage block into proper relation with the anvil block for the work to be done. The inner or swage face of the swage block 3 is provided with a pin hole 14, and the inner or swage face of the anvil block 2 is provided with a pin 15, which engage when the swage block is brought up strongly against the saw 29 interposed between it and the anvil.

By referring to Fig. 4, where the outline of the anvil block and the swage block are seen, it would be seen that only a little over one-fourth of the face of the swage block, or of the anvil block, engage against the tooth of the saw 29 and the end of the anvil block, and the end of the swage block may be properly shaped on the one quarter thereof, to give to a tooth a right hand set, and on another quarter thereof to give to the tooth a left hand set, and at still another place where it will not interfere with the operation in either direction may be located the pin 15 in the hole 14.

The protruding end of the screw 11 is provided with a slabbed off crank hold 17, and the screw actuating the swage block is itself actuated by a hand crank 18.

The body block of the tool is brought to its proper position with reference to the tooth by guides, one of which is found in the slot 19, which crosses the guide block, and extending into it to the proper depth to allow the tool to clear the tooth as it travels therealong.

At the front of the tool is a bracket arm 21, which sustains, adjustably connected with it, a rest or guide 22, held to the bracket arm 21 by thumb screw 23, which passes through the bracket through a long slot 21 in the guide, and through a suitable washer 26. The lower end of the guide 22 is provided with a foot 27, which engages under the tooth *a* and against the tooth *b*, whereas the bottom end of the main part of the guide 22 engages on the points of several teeth, giving to the tool an adjustment in this respect, which regulates the tool along the axis of the saw, 29, keeping it parallel both to the face of the saw and to the lines passing along the points of the teeth. At the rear, the tool is supported by a rearwardly projecting rest 28, which curves in U-form from an end of the body of the tool to a position somewhat to the rear thereof, and serves to hold the tool in proper position for its proper action upon the end of the tooth. The tool is itself temporarily clamped to the saw by a hand actuated cam 30 hung on a vertical rod 31, and actuated by short crank arm 32, by means of which it may be partially turned on its vertical axis and brought into gripping engagement with the side of the saw, which is held between the cam and the face of the slot 19, which lies opposite the cam.

In use this tool is set with the swages to form the tooth properly in one direction, either to the right or the left, and the saw is set by operating on each alternate tooth throughout its extent. The anvil block and swage block are then reversed, and the tool again run over the saw, setting those teeth which were before left unset, and the work is thus finished. A single tool with a single setting of adjustment, thus suffices to complete the work. With this tool the teeth may be set over to the form shown at 33, 34 in Fig. 7.

What I claim is:—

1. In a saw setting tool, in combination with a cylindrically bored body block, an anvil member rotatably engaging therewithin, whereby its working face may be adjusted as desired with respect thereto, a holding screw whereby the anvil is held from undesired rearward movement within the block, a stem member projecting from the rear end of said anvil member and through the body of said screw, whereby the anvil may be rotated, a movable swage block engaging within the portion of the bore not occupied by said anvil member, and block having a complementary working face to that of said anvil member, and being held from rotation with respect to the body block by the engagement of a projecting feather portion within a corresponding cut-away portion of the mass of the body block, and an actuating screw passing through a complementarily threaded portion of the body block, and having a swiveled connection with said anvil block, whereby it may be projected against a saw tooth interposed between it and said anvil member and subsequently positively retracted from such position, substantially as described.

2. In a saw setting tool, in combination with a body block, an anvil and a setting punch located within the cylindrically bored portion thereof and held from undesired rotation with respect thereto though capable of movement along their common longitudinal axis, an adjusting screw whereby the anvil is adjusted to and held in the exact position desired, the central portion of said adjusting screw being apertured for the engagement therethrough of a projecting portion of the anvil for purposes of rotative adjustment, whereby the working face of the anvil may be adjusted to the desired position with respect to the body block and to the setting punch an actuating screw for the setting punch, having a swiveled connection therewith, whereby it may be projected or retracted along its longitudinal axis, a guide bracket, extending to the front of the body block and having an adjustable guide thereon, and a guide arm extending to the rear thereof, substantially as described.

In testimony whereof, I sign this specification in the presence of two witnesses.

LAWRENCE G. McKAM.

Witnesses:
 CHARLES F. BURTON,
 WILLIAM M. SWAN.